May 11, 1954     J. KING     2,678,217
PIPE INSERTER AND REMOVER
Filed Dec. 26, 1951
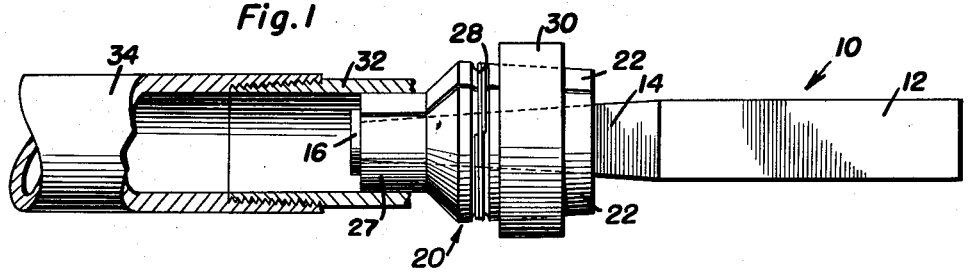
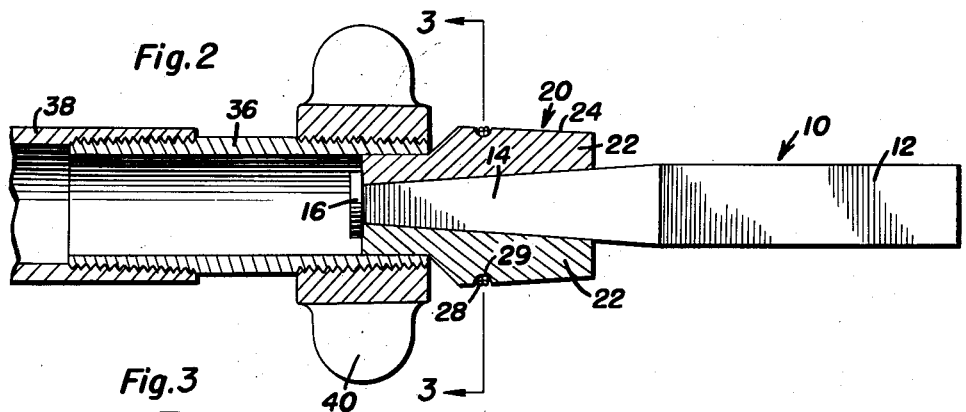
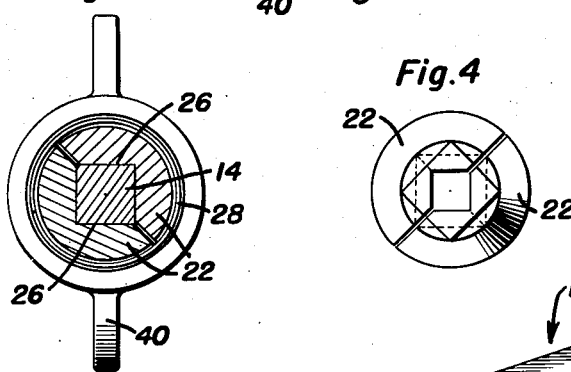
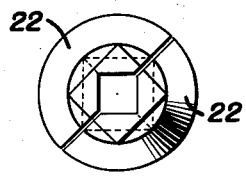
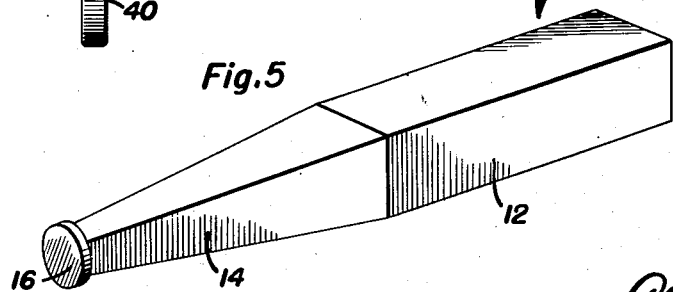
Joe King
INVENTOR.

Patented May 11, 1954

2,678,217

UNITED STATES PATENT OFFICE 2,678,217

PIPE INSERTER AND REMOVER

Joe King, Murphysboro, Ill.

Application December 26, 1951, Serial No. 263,202

4 Claims. (Cl. 279—2)

This invention comprises novel and useful improvements in a pipe inserter and remover and more specifically pertains to an inside pipe wrench or tool which is adapted for expanding engagement with the inside of a pipe, a bore in a bolt or the like for securely gripping the pipe or bolt and inserting or removing the same from a threaded passage.

The primary object of this invention is to provide an improved tool to facilitate the removal of screw threaded articles from their seats where it is otherwise difficult or impossible to obtain a secure engagement with the external surfaces of the articles, and to enable the insertion of such articles into threaded passages.

A further object of the invention is to provide a tool in conformity with the preceding object which shall be of simple construction and wherein all of the elements of the tool are retained together in a single compact assembly.

Still another object of the invention is to provide an improved tool in conformance with the preceding object which shall include novel means for locking the tool in its radially expanded and pipe gripping position.

A still further important object of the invention is to provide a mechanism which shall secure a non-slipping engagement upon the internal surface of a nipple or pipe and wherein means are provided for preventing rupture of the nipple or pipe during the application of the tool thereto.

These, together with various ancillary objects and features of the invention, which will later become apparent as the following description proceeds, are attained by the present invention, a preferred embodiment of which has been illustrated, by way of example only, in the accompanying drawings, wherein:

Figure 1 is an elevational view, parts being broken away and shown in section, showing the novel pipe tool applied to a portion of a pipe for removing the same from its screw-threaded engagement with another pipe section;

Figure 2 is a view somewhat similar to Figure 1, but showing the novel tool, partly in elevation and partly in section applied to the end of a short nipple for inserting or removing the same from a pipe section;

Figure 3 is a vertical transverse sectional view taken substantially upon the plane indicated by the section line 3—3 of Figure 2;

Figure 4 is an end elevational view of the novel tool; and

Figure 5 is a perspective view of the expander shaft forming a part of the tool.

Referring now more specifically to the accompanying drawings, wherein like numerals designate similar parts throughout the various views, it will be seen that the novel tool comprises an expander shaft indicated generally by the numeral 10, which shaft is of non-circular cross section, and may conveniently be of square shape as illustrated, this shaft having a shank or handle portion 12 which is of a non-circular cross sectional area throughout its length and from one end of which extends a tapered portion 14 having a circular disk or head 16 at the end thereof.

The tool further includes an elongated expansion body indicated generally by the numeral 20 and which may conveniently consist of a plurality of longitudinal sections 22, which are preferably complementary to each other. As illustrated, the body includes two such sections each of which is a substantially semi-cylindrical member, the outer surface of the sections of the body in their assembled position having a tapering external surface 24 and being further provided with a circumferential groove 26 extending about this exterior surface intermediate the ends of the same. At what may be termed its forward end, the body is provided with a diametrically reduced cylindrical portion 27 which is of sufficient diameter to be received within the end of the article which it is decided to extract from or insert into a screw-threaded seat.

The complementary sections 22 are provided with axial, tapered channels or bores 26 therethrough. These two bores are complementary and in their entirety form a tapered passage of the same cross-sectional shape as that of the tapered portion 14 of the expander shaft 10, and of a cross sectional area substantially equal to that of the smaller end of the tapered portion 14.

A resilient ring or spring 28 encircles and is seated in the groove 29 for resiliently urging the sections of the body radially inward with respect to each other and upon the tapered portion 14.

The cylindrical bushing or ring 30 is slidably received upon the tapered surface 24 of the body and is movable axially therealong to securely lock the sections of the body upon the tapered portion 14 after the latter has radially expanded the body sections.

It will thus be apparent that the head 16 prevents endwise withdrawal of the expander shaft from the body while the resilient member 28 resiliently retains the section upon the tapered portion.

From the foregoing, it is believed that the operation of the device will now be readily understood. When it is desired to remove the broken portion of a pipe 32 from its screw threaded engagement with another pipe section 34 or other member, the cylindrical portion 27 of the radially contracted body 20 is inserted in the broken end of the pipe section 32. The shank portion 12 of the expander shank is then driven axially into the body whereby the tapered portion 14 engaging the wedging surfaces 26 radially expands the sections 22 of the body causing the portions 27, which function as clutch jaws, to engage the inner surface of the broken pipe section 32. The ring 30 is then moved axially towards the broken pipe section thus locking the exterior surfaces 24 of the sections 22 against outward movement, and to the tapered portion 14 of the expander shaft. A wrench or other tool is then applied to the non-circular shank 12 and by virtue of the non-slipping punching action of the body portion 28 upon the interior surface of the broken pipe section 32, the latter may be unscrewed and removed from the pipe or other member 34.

When it is desired to remove a broken bolt or the like, it is merely necessary to drill a bore through the head or upper end of the same, whereupon the tool is then inserted in and locked to the internal surface of the bore in the manner previously set forth, whereby the bolt may be readily extracted.

As illustrated in Figure 2, the tool may be similarly applied to the internal surface of a short externally threaded nipple or the like 36, in order to safely apply the same or remove the same from a pipe section or other member 38. A wing nut 40 may be applied to the externally threaded surface of the nipple in order to reinforce the same and prevent rupture or damage of the nipple as the tool is applied thereto.

From the foregoing, the construction and operation of the device will be readily understood and further explanation is believed to be unnecessary.

However, since numerous modifications and changes will readily occur to those skilled in the art, it is not desired to limit the invention to the exact construction shown and described, and accordingly all suitable modifications and equivalents may be resorted to, falling within the scope of the appended claims.

Having described the invention, what is claimed as new is:

1. A pipe tool comprising an elongated expansion body having a portion adapted to engage the inside of the end of a pipe and an expansion shaft axially slidable in said body, said body comprising a plurality of longitudinally extending sections, said expansion shaft including a tapered portion disposed between said sections for causing radial displacement of the sections upon axial movement of the shaft, means preventing withdrawal of said shaft from said body, and means resiliently securing said sections upon said shaft, said shaft being of non-circular cross section and said sections having tapering surfaces engaging the tapered portion of said shaft, said body including a rearwardly tapered, frustoconical exterior surface, and a ring longitudinally slidable on said body into frictional engagement with said tapered exterior surface to maintain the body in a selected expanded position on said shaft.

2. A pipe tool comprising an elongated expansion body having a portion adapted to engage the inside of the end of a pipe and an expansion shaft axially slidable in said body, said body comprising a plurality of longitudinally extending sections, said expansion shaft including a tapered portion disposed between said sections for causing radial displacement of the sections upon axial movement of the shaft, means preventing withdrawal of said shaft from said body, means resiliently securing said sections upon said shaft, the exterior surface of said body having a tapered surface, and a locking ring slidably mounted on said tapered surface.

3. A pipe tool comprising an elongated expansion body having a portion adapted to engage the inside of the end of a pipe and an expansion shaft axially slidable in said body, said body comprising a plurality of longitudinally extending sections, said expansion shaft including a tapered portion disposed between said sections for causing radial displacement of the sections upon axial movement of the shaft, means preventing withdrawal of said shaft from said body, means resiliently securing said sections upon said shaft, said sections having an external circumferential groove, said resilient means comprising a spring seated in said groove and compressively embracing said sections, said body including a rearwardly tapered, frusto-conical exterior surface, and a ring longitudinally slidable on said body into frictional engagement with said tapered exterior surface to maintain the body in a selected expanded position on said shaft.

4. A pipe tool comprising an elongated expansion body having a forward end adapted to engage the inside of the end of a pipe and an expansion shaft slidable in said body, said body comprising a plurality of longitudinally extending sections, said expansion shaft including a tapered portion disposed between said sections for causing radial displacement of the sections upon axial movement of the shaft, means preventing withdrawal of said shaft from said body, means resiliently securing said sections upon said shaft, said body including a rearwardly tapered frusto-conical exterior surface, and a ring slidable on said body into frictional engagement with said tapered exterior surface to maintain the body in a selected expanded position on said shaft.

References Cited in the file of this patent
UNITED STATES PATENTS

| Number | Name | Date |
| --- | --- | --- |
| 532,765 | Clever | Jan. 22, 1895 |
| 587,677 | Martin | Aug. 3, 1897 |
| 1,067,195 | Raithel | July 8, 1913 |
| 1,075,753 | Bastian et al. | Oct. 14, 1913 |
| 1,442,626 | McGee | Jan. 16, 1923 |
| 1,507,645 | Wedgeworth | Sept. 9, 1924 |
| 2,592,420 | Harrison | Apr. 8, 1952 |